(12) United States Patent
McCormick

(10) Patent No.: US 7,044,689 B1
(45) Date of Patent: May 16, 2006

(54) SILT FENCE INSTALLATION APPARATUS

(76) Inventor: Christopher D. McCormick, 185 Highway 92, Pleasantville, IA (US) 50225

( * ) Notice: Subject to any disclaimer, the term of this patent is extended or adjusted under 35 U.S.C. 154(b) by 149 days.

(21) Appl. No.: 10/756,242

(22) Filed: Jan. 13, 2004

(51) Int. Cl.
*E02D 17/13* (2006.01)
*E02D 17/20* (2006.01)
*E02F 5/10* (2006.01)

(52) U.S. Cl. .................... 405/302.6; 405/116; 405/183; 405/302.7; 37/366; 37/367; 37/404; 172/720

(58) Field of Classification Search ................ 405/116, 405/157, 176, 180, 181, 183, 184.4, 302.6–7; 37/366, 367, 370, 380, 404, 466; 172/699, 172/720
See application file for complete search history.

(56) References Cited

U.S. PATENT DOCUMENTS

| 3,182,459 | A | * | 5/1965 | Grether et al. ............... 405/115 |
| 3,298,183 | A | * | 1/1967 | Grether et al. ................. 405/36 |
| 3,308,628 | A | * | 3/1967 | Nichols ....................... 405/181 |
| 4,293,238 | A | * | 10/1981 | Kuzin et al. ................. 405/175 |
| 4,834,581 | A | * | 5/1989 | Soules, Jr. ................... 405/182 |
| 5,615,499 | A | | 4/1997 | McGuire et al. ............... 37/367 |
| 5,915,878 | A | | 6/1999 | Carpenter ..................... 405/38 |
| 5,943,798 | A | | 8/1999 | McGuire et al. ............... 37/367 |
| 5,988,948 | A | * | 11/1999 | Featherstone ................ 405/164 |
| 6,053,665 | A | | 4/2000 | Richardson .............. 405/302.6 |
| 6,158,923 | A | | 12/2000 | Wheeler et al. ............. 405/116 |
| 6,397,500 | B1 | * | 6/2002 | Hall ............................. 37/367 |
| 6,398,459 | B1 | | 6/2002 | Vreeland ................. 405/302.6 |
| 6,517,294 | B1 | | 2/2003 | Vreeland ................. 405/302.7 |
| 6,796,747 | B1 | | 9/2004 | Vreeland ................. 405/302.7 |
| D502,470 | S | * | 3/2005 | McCormick ................. D15/10 |
| D504,134 | S | * | 4/2005 | McCormick ................. D15/10 |
| 2002/0192029 | A1 | | 12/2002 | Vreeland ..................... 405/116 |

FOREIGN PATENT DOCUMENTS

| DE | 10142376 | * | 4/2005 |
| JP | 05161402 | * | 6/1993 |
| WO | 9923314 | * | 5/1999 |

OTHER PUBLICATIONS

Photos of silt fence machine sold by Gary Harms d/b/a Universal Welding of Wellsburg, IA at least as early as Aug. 1, 2002.

* cited by examiner

*Primary Examiner*—Jong-Suk (James) Lee
(74) *Attorney, Agent, or Firm*—Wenzel & Harms, P.C.; Allan L. Harms

(57) ABSTRACT

A machine to install the lower edge of silt fence fabric in a seam in the soil includes a frame with a plow member attached. The frame can be mounted to the three point hitch of a tractor so that the machine can be raised, lowered, and tilted while being supported by the tractor. Silt fence fabric from a roll carried on a rod on the machine is fed into a chute formed by two parallel plates of the plow member. The fabric is drawn out the front of the plow member and drawn along the side of the plow member by friction with the soil through which the plow member is drawn.

27 Claims, 7 Drawing Sheets

SILT FENCE INSTALLATION APPARATUS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Silt fence is a fabric barrier used to restrain movement of surface water and silt around construction projects in order to reduce erosion. The fabric is supplied in rolls and is typically twenty-four to forty-two inches in width. To be properly installed, the lower edge of the barrier must be buried with most of the barrier standing upright above the soil surface.

Installation of the fabric barrier may be accomplished by manually digging a shallow trench to a depth of about twelve inches, unrolling the fabric along the trench, placing the edge of the fabric in the trench, and then refilling the trench. The unburied part of the fabric is then stood upright by fastening its upper part to upright posts placed at intervals along the fence. This is of course very labor intensive.

One machine developed to install a fabric barrier is illustrated in U.S. Pat. No. 3,182,459 which shows apparatus mounted beside the front of a tractor and includes a post driving apparatus. Another machine to install silt fence is shown in U.S. Pat. No. 5,915,878. This latter machine carries a roll of fabric transverse to the line of travel of the machine and uses a wheel to drive part of the fabric into a trench sliced by the machine.

BRIEF SUMMARY OF THE INVENTION

It is the primary object of the invention to provide a silt fence installation machine which can be mounted to the three point hitch of a tractor of to the bucket mounting of a skid loader, and which smoothly and efficiently installs silt fence fabric from a roll carried on the machine into a seam in the soil created by the machine's plow member.

An upright plow member is attached to a tongue hinged to the rear of a frame which is mountable to the three-point hitch of a typical tractor. With an adapting plate, the frame may be mounted to a bucket mounting of a skid loader or other power unit providing lifting and tilting operation of the silt fence installation machine. Springs on either side of the frame interconnect the frame with the tongue and serve to center the tongue and plow member in longitudinal alignment with the frame. The plow member is triangular and includes a stationery plate and a moveable plate which, when the machine is at rest and raised out of the soil, is pivotable about the trailing inclined edge of the stationery plate between a closed position and an open position. The stationery plate and the moveable plate are substantially the same in general shape and size so that when the moveable plate is in its closed position ready for installation of silt fence, the moveable plate is parallel to the stationery plate with a small gap between the moveable plate and the stationery plate. Each plate has a top edge which bends away from the opposing plate so that when the moveable plate is in the closed position alongside the stationery plate, the top edges of the plates create a flared opening into the chute formed by the plates and into which the fabric passes from a roll retained on a bar which extends generally over the plow member and is supported on an upright member fixed to the frame of the machine.

When the moveable plate is closed and the plow member is in position for installation of silt fence, the plow member will be oriented so that its top edge is generally horizontal and its leading edge is vertical, with the trailing edge of the plow member making the hypotenuse of the triangular plow member's shape. A stainless steel cylindrical rod extends along the trailing edge within the chute formed by the plates and is secured at its ends to the stationary plate.

The leading edge of the stationery plate includes a blade with a tooth at its bottom which protrudes forward from the leading edge and serves to break the soil as the plow member is drawn into and through the soil. The leading edge of the stationery member also includes a transverse deflector which covers the gap between the leading edges of the stationery plate and the moveable plate when the moveable plate is in the closed position and serves to prevent soil from entering the plow member at its leading edge. The deflector is a rigid narrow strip welded at a perpendicular to the leading edge of the stationery member which extends along much of the length of the leading edge of the stationery plate.

The leading end of the frame to which the plow member is mounted includes a generally triangular, vertically oriented mounting plate with the triangle's base at the bottom. The mounting plate includes a pair of connection points spaced apart at the bottom of the plate and a connection point at the pinnacle of the plate. These connection points may be fastened to the three mounts of a tractor's three point hitch. Alternatively, the mounting plate may be mounted to the bucket arms of an end loader with its bucket removed. When installed on an end loader, necessarily the end loader must be driven in reverse such that the silt fence installing machine is drawn behind the end loader. Because of the adjustability of either the three point hitch or the end loader's bucket arms, the invention can be carried on the tractor or end loader and selectively raised and lower, as well as tilted such that the tooth will engage the ground first and help to draw the plow member into the soil. After entering the soil while being drawn forward, the invention can then be oriented horizontally, by adjustment of the three-point hitch orientation, for continuous installation of silt fence fabric.

The silt fence fabric is drawn downward from a supply roll and fed into the chute formed by the plates of the plow member and it is passed around the rod at the trailing edge of the plow where its longitudinal orientation is changed from vertical to horizontal. After passing the fabric around the rod the fabric is directed toward the front of the plow member and is drawn out of the front of the plow member and around the leading edge of the moveable plate and alongside the outer wall of the moveable plate such that friction of the soil through which the plow member is passing will draw fabric from the plow member and leave it in the seam in the earth created by the plow member. Except for initially threading the fabric through the plow while the machine is stopped in a raised position, no manual labor is necessary. The machine will install fabric with its lower edge in the soil seam as the plow member is drawn through the soil.

It is a further object to provide a silt fence fabric installation machine which has no moving parts, which is simple to maintain and use, and which disrupts little soil and may be operated with minimal surrounding soil compaction. It is also an object of the invention to provide an easily maintained silt fence installation machine which can be mounted to the bucket arms of a skid loader.

These and other objects of the invention will become apparent from examination of the description and claims which follow.

BRIEF DESCRIPTION OF THE SEVERAL VIEWS OF THE DRAWING(S)

DETAILED DESCRIPTION OF THE INVENTION

Figure 1:
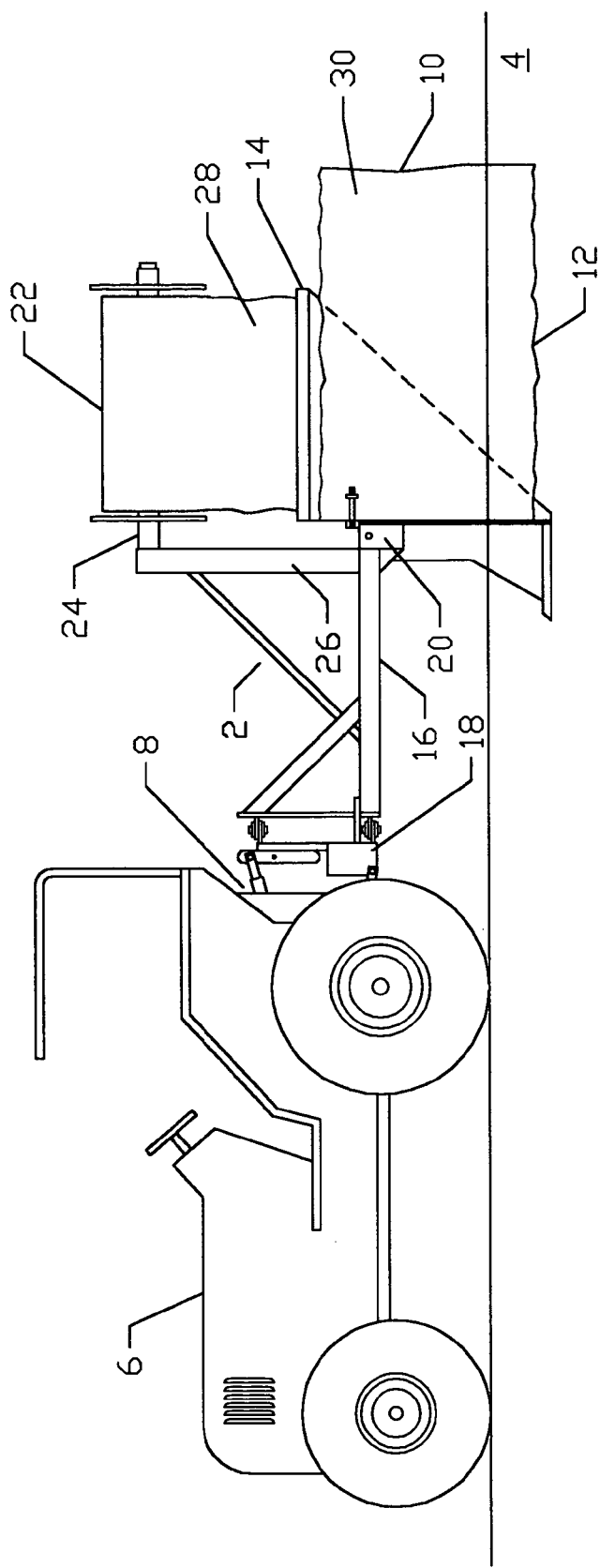
FIG. 1 is a front elevation of an embodiment of the silt fence installation machine according to the present invention, being drawn by a tractor.

FIG. 1 discloses the invention 2 being drawn by a power unit, namely tractor 6, equipped with a three-point hitch 8 as invention 2 installs a fabric silt fence 10 with its lower portion 12 trapped in a seam cut in the soil 4 by plow member 14. Invention 2 comprises a frame 16 which has a leading end 18 mounted detachably to the three-point hitch 8. Plow member 14 is fixed to the trailing end 20 of frame 16. A roll 22 of fabric 28 is carried on horizontal rod 24 which is supported on frame 16 by upright 26 such that roll 22 of fabric 28 is located above plow member 14. Fabric 28 feeds from roll 22 into plow member 14 which installs fabric 28 partly in soil 4. As invention 2 is pulled along by tractor 6, fabric 28 is pulled alongside plow member 14 in an upright orientation and its lower portion 12 is retained in the seam created by plow member 14 with about twelve to eighteen inches of fabric 28 retained in the soil and with upper part 30 of fabric 28 remaining above soil 4 to serve as the silt fence 10. Typically posts (not shown) will be installed along silt fence 10 and upper part 30 of fence 10 will be attached to the posts in order to cause fence 10 to stand upright.

Figure 2:
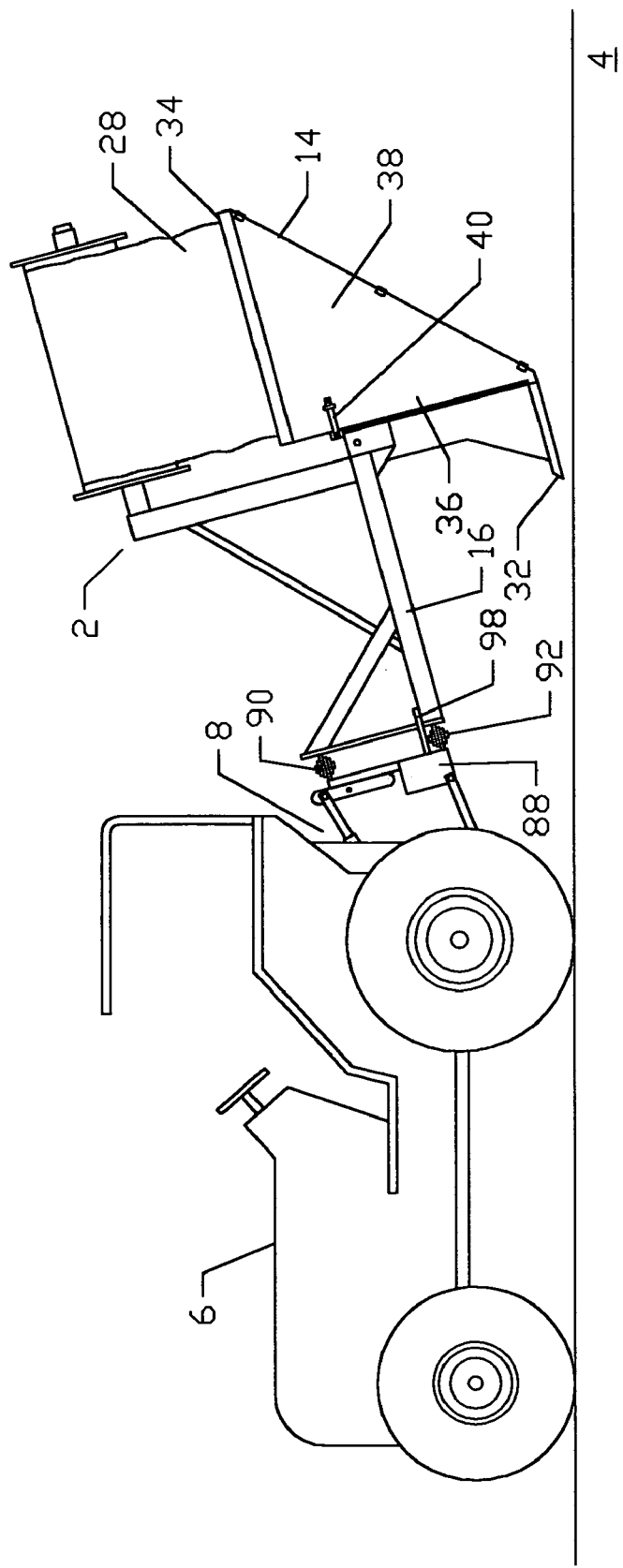
FIG. 2 is a front elevation of the silt fence installation machine of FIG. 1 in a raised position supported on the three-point hitch of the tractor.

Because invention 2 is mounted to three point hitch 8, it can be raised, lowered, and tilted, as well as transported by tractor 6 and requires no moving parts or wheels to carry it. FIG. 2 illustrates a variation in orientation of invention 2 by operation of three-point hitch 8. In FIG. 2 invention 2 is inclined for insertion of tooth 32 of plow member 14 into soil 4 as tractor 6 proceeds forward. Plow share 38 of plow member 14 is in its closed position with latch 40 engaged. In the view of FIG. 2, fabric 28 is shown fed into the top side 34 of plow share 38 but not emanating therefrom. Fabric roll 22 need not be removed from invention 2 while invention 2 is transported by the tractor 6. A pivot limiter 98 is tempo-rarily fixed between mounting plate 88 and frame 16 to prevent rotation about hinge assemblies 90, 92 while invention 2 is tilted from horizontal.

Figure 3:
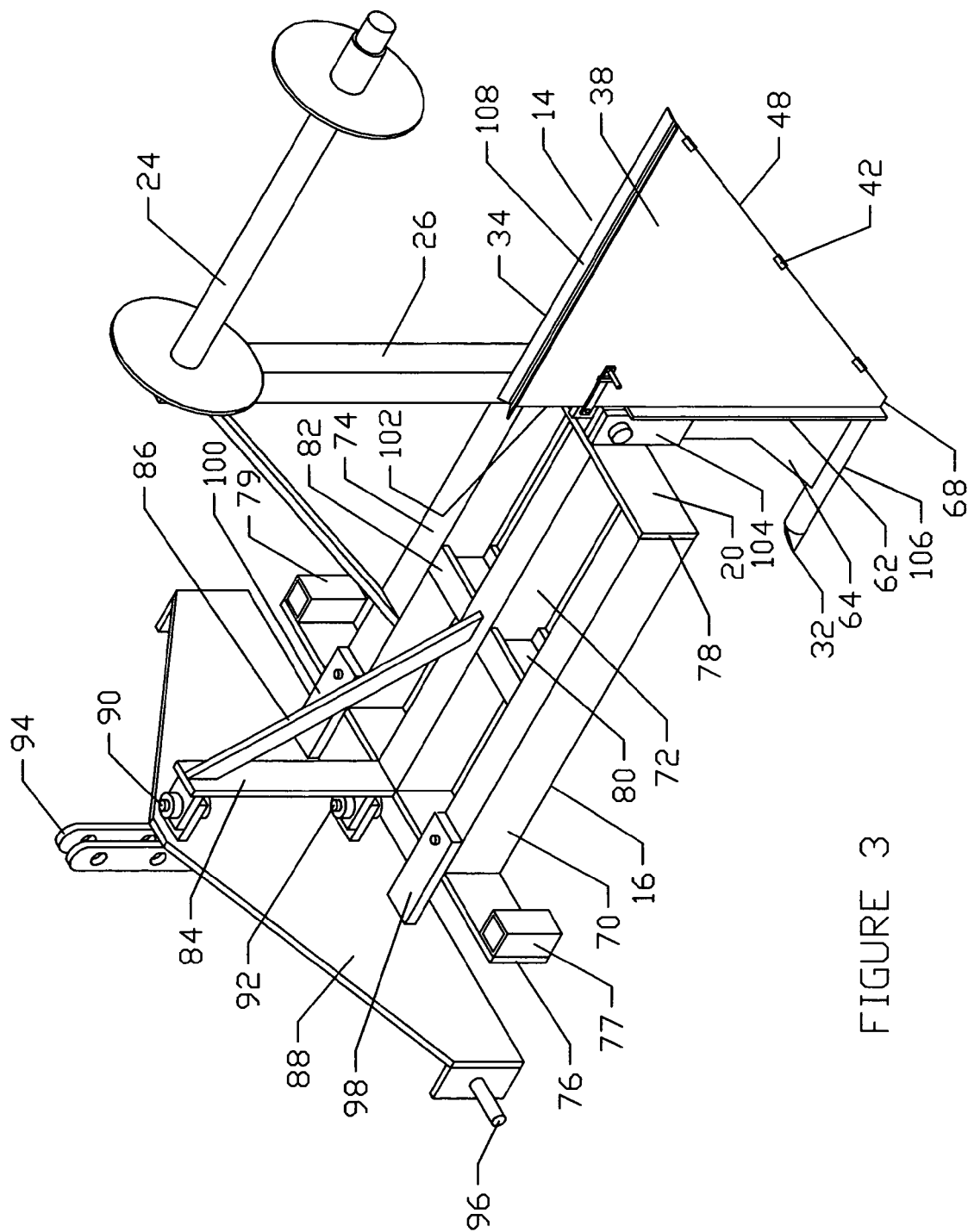
FIG. 3 is a left rear perspective of the silt fence installation machine of FIG. 1.

FIG. 3 discloses the invention 2 in a perspective from the left rear. Frame 16 comprises longitudinal beams 70, 72, 74 joined by front end plate 76 and rear end plate 78. Stabilizers 80, interconnect outer beams 70, 74 with central beam 72 generally midway along the length of frame 16. A front upright member 84 is braced by forward brace 86. Front upright member 84 is hingedly mounted to mounting plate 88 by vertically aligned upper and lower hinge assemblies 90, 92, such that mounting plate 88 will be pivotable about a generally vertical axis relative to frame 16. Mounting plate 88 includes upper connection bracket 94 which permits a hydraulic cylinder on a top link of the tractor's three-point hitch to be detachably fixed thereto. At opposing ends of triangular mounting bracket 88 are pins 96 which are available for detachable linking to the lower arms of a three-point hitch. Stand brackets 77, 79 are fixed to opposing sides of frame 16 to receive standards (not shown) for supporting the frame 16 when invention 2 is disconnected from the tractor 6 or other power unit. On opposing sides of lower hinge assembly 92 are pivot limiters 98, 100 which are mounted to and extend rearwardly from mounting plate 88 and may be selectively fixed to outer beams 70, 74 respectively when pivotal movement of mounting plate 88 on frame 16 is undesirable. In operation, pivot limiters 98, 100 are freed from outer beams 70, 74 thereby allowing invention 2 to be drawn along a curve by the power unit to which it is mounted.

Plow member 14 is mounted at the trailing end 20 of frame 16. Plow member 14 comprises plow share 38 along with blade 64 and tooth 32 which leads plow share 38. Deflector 62 is mounted transversely to leading edge 102 of plow share 38. Blade 64 of plow member 14 is fixed to mounting bracket 104 which is fixed to trailing end 20 of frame 16. Hinges 42 are mounted along trailing edge 48 of plow share 38. In operation, leading edge 102 of plow share 38 is oriented substantially vertically and top side 34 is oriented horizontally with plow share 38 approximating a right triangle. Trailing edge 48 defines the hypotenuse of the right triangle approximated by plow share 38. The bottom 68 of plow share 38 truncates the lower corner of the triangular shape of plow share 38 with bottom 68 aligned with the lower edge 106 of tooth 32 to allow fabric to be drawn to the lowest reach of plow share 38.

Top side 34 of plow share 38 includes flared elongate opening 108 into which a continuous sheet of fabric may be pulled from a roll carried on bar 24. Upright 26 supports bar 24 above flared opening 108. Roll stops 110, 112 are carried on bar 24 which is preferably round. Outer roll stop 112 may be removed to allow a roll of fabric to be slid onto bar 24.

Frame 16 is provided with stand brackets 114 and 116 on its opposing sides adjacent front end plate 76. Stand brackets 114 and 116 may receive standards (not shown) which may support invention 2 when it is not mounted to a three-point hitch of a power unit.

Figure 4:
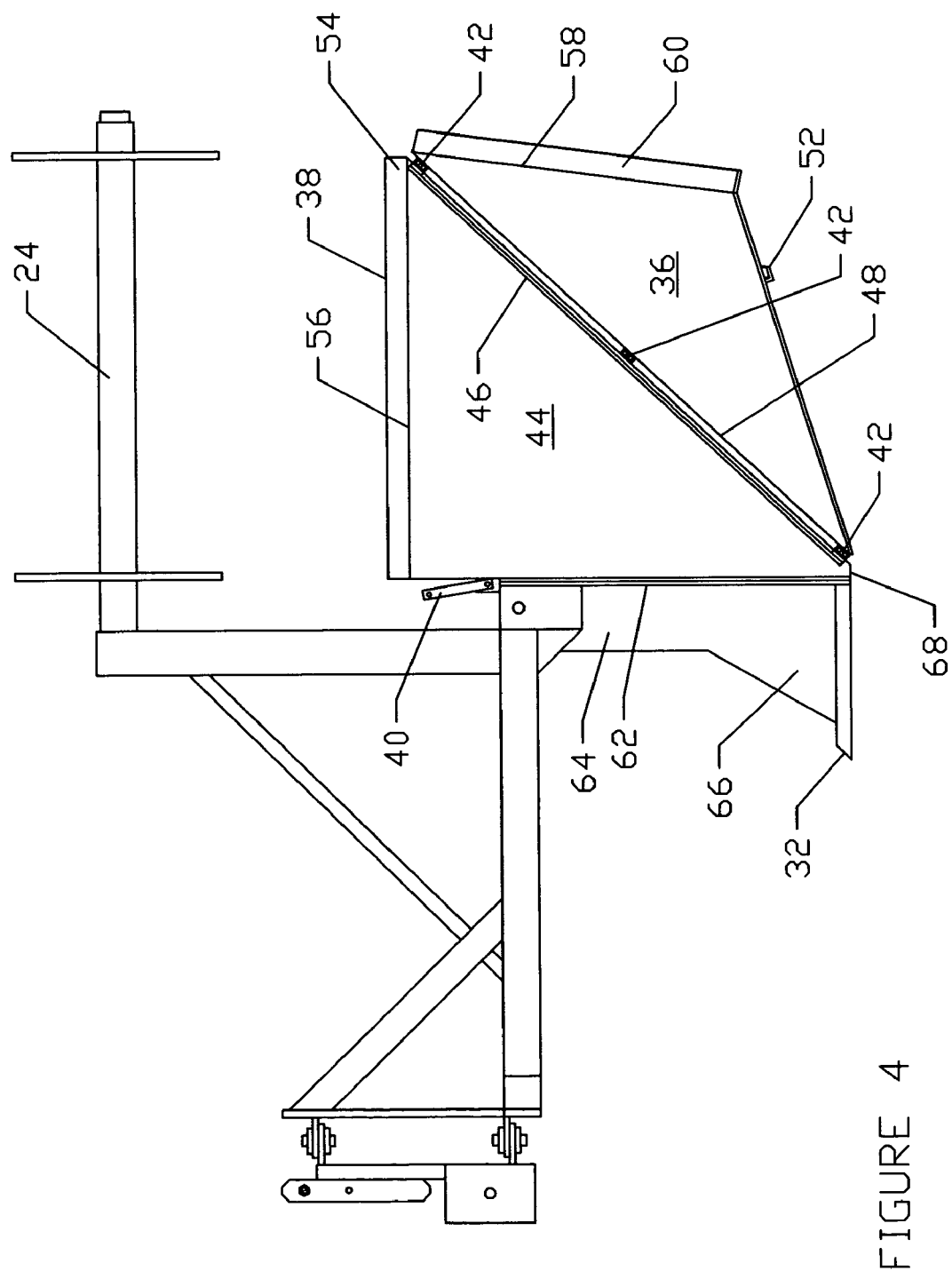
FIG. 4 is a front elevation of the silt fence installation machine of FIG. 1 with the plow member in its open position.

Referring now to FIG. 4, invention 2 is illustrated with no fabric supply thereon and with moveable plate 36 of plow share 38 of plow member 14 shown in its open position pivoted away from stationery plate 44 about hinges 42 of plow share 38. An elongate round cross section rod 46 is fixed at its opposing ends to stationery plate 44 and is oriented at substantially a forty-five degree angle relative to the leading edge 102 of plow share 38 with its lower end near bottom 68 of plow share 38. Preferably rod 46 is constructed of stainless steel to reduce drag on the fabric 28 as it moves around rod 46. Using stainless steel for rod 46 also reduces incidence of its rusting which also would give rise to drag on fabric 28. Alternatively rod 46 could be journaled at its ends so that it could roll freely about its longitudinal axis. Latch 40 is mounted to stationery plate 44 in order to selectively retain moveable plate 36 in its closed position. In this figure, latch 40 is shown in its unlatched position because moveable plate 36 is in its open position.

In its closed position, moveable plate 36 is parallel to and spaced a small distance apart from stationery plate 44 thereby creating a chute for fabric to pass through. A bend 54 is formed at the top 56 of stationery plate 44 and a corresponding bend 60 is formed at the top 58 of moveable plate 36 such that when moveable plate 36 is in the closed position, top side 34 of plow share 38 is flared, that is, bend 54 is directed upward and away from the plane of moveable plate 36 and bend is directed upward and away from the plane of stationery plate 44 when movable plate 36 is closed and parallel to stationery plate 44.

Mounted at the leading edge 62 of stationery plate 44 is deflector plate 64 which extends transversely to the plane of stationery plate 44 and covers the gap between stationery plate 44 and moveable plate 36 when moveable plate 36 is closed and latched to stationery plate 44. A blade 64 is mounted forward of plow share 38 and may be integral and coplanar with stationery plate 44.

Blade 64 tapers at approximately twenty to thirty degrees from vertical along its lower part 66 to its widest part which is joined below by tooth 32 which extends forward of blade 64. The forward end of tooth 32 is slanted at about twenty degrees from vertical.

Deflector 62 may be a metal strip welded to stationery plate 44 at its junction with blade 64 and preferably is perpendicular to stationery plate 44 so that deflector 62 does not interfere with movement of moveable plate 36 to its open position. Deflector 62 extends from bottom 68 of plow share 38 upwards sufficiently, at least eighteen inches, to cover the gap between plates 36 and 44 to prevent debris and mud from entering plow share 38.

Figure 5:
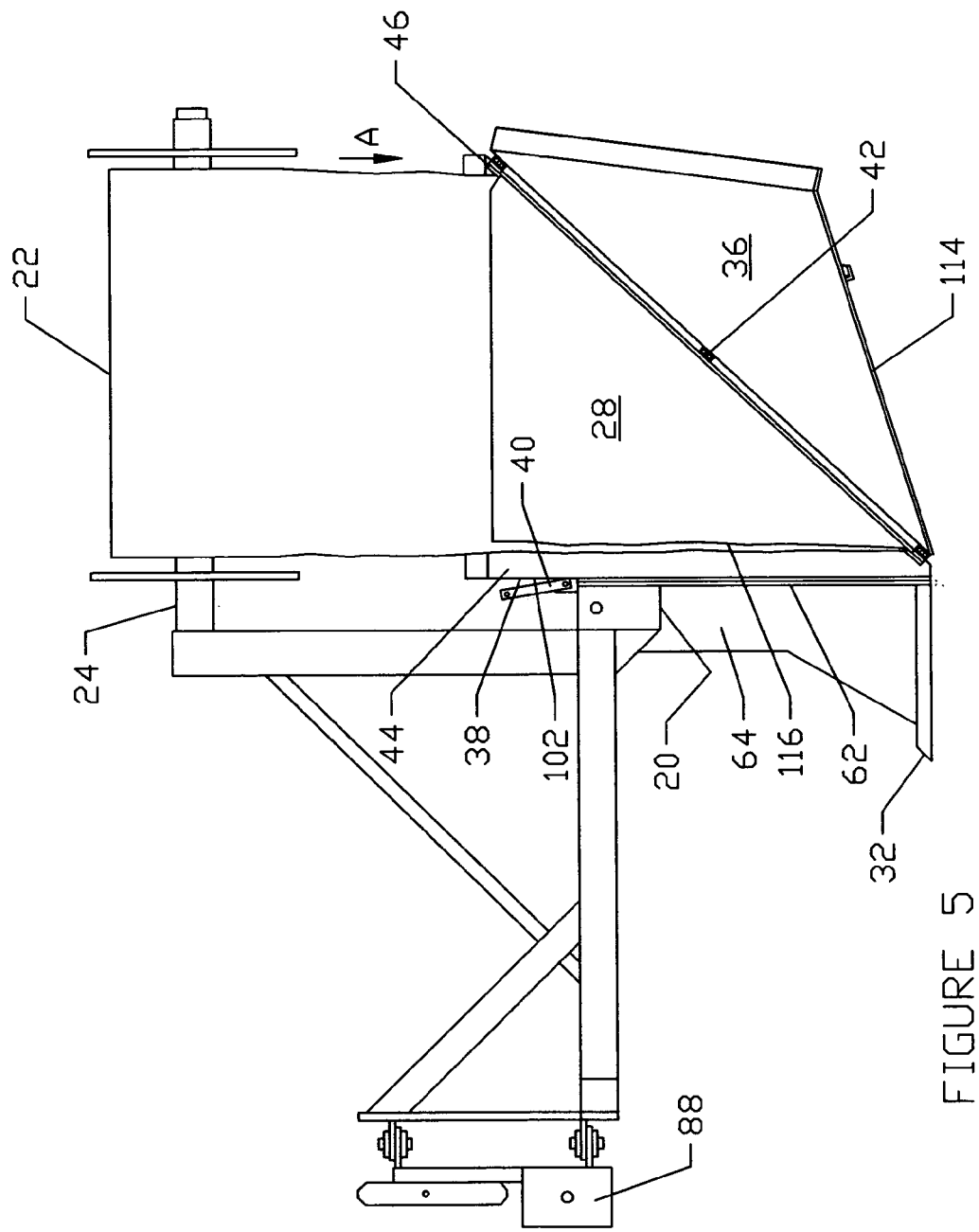
FIG. 5 is a front elevation of the embodiment of the silt fence installation machine of FIG. 1 with the plow member in its open position and with silt fence fabric shown partially threaded through the plow member.

Referring now to FIG. 5, invention 2 is shown with plow share 38 while it is out of the earth and open, that is with moveable plate 36 pivoted to its open position away from stationery plate 44. It can be seen that fabric 28 has been drawn from fabric roll 22 on bar 24 and has been threaded around and behind rod 46 so that the vertical direction of movement A of fabric 28 has been redirected toward the leading edge 102 of plow share 38. Once the leading edge 116 of fabric has been drawn sufficiently forward of leading edge 102, moveable plate 36 may be pivoted about hinge 42 to its closed position adjacent and parallel to stationery plate 44 and latch 40 may then be moved to its closed position to retain moveable plate 36 parallel to stationery plate 44.

Fabric 28 then may be passed around the leading edge 114 of moveable plate 36 and pulled rearward along plow share 38 manually. Then invention 2 is ready for tooth 32 and blade 64 to be drawn into the soil. As plow member 14 is drawn through the soil, fabric 28 is drawn from roll 22 into plow share 38, around rod 46, around leading edge 114 of moveable plate 36 behind deflector thereby reversing direction, and then along plow share 38 due to friction with the soil through which plow member 14 is passing.

Figure 6:
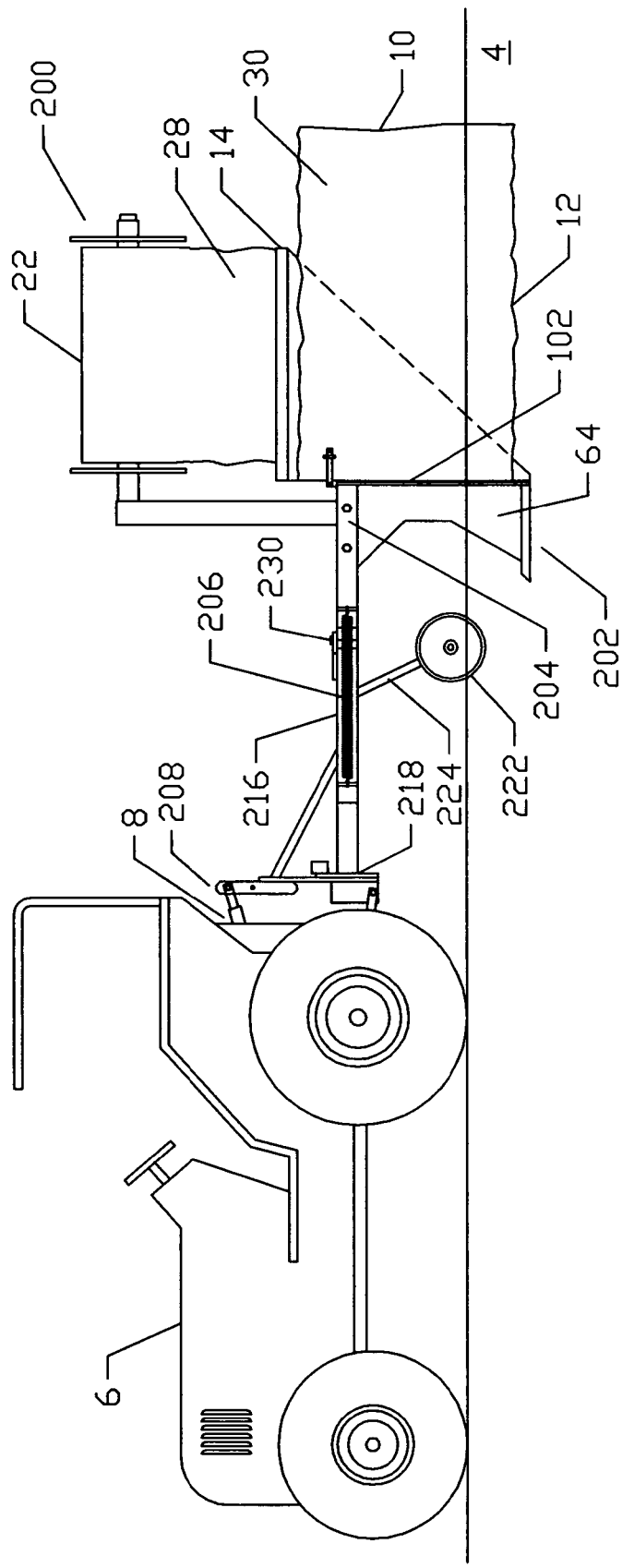
FIG. 6 is a front elevation of the preferred embodiment silt fence installation machine according to the invention, shown in operation installing silt fence as it is drawn by a tractor.

FIG. 6 discloses a preferred embodiment of silt fence installing machine 200 being drawn by a tractor 6 through soil 4. Silt fence installing machine 200 inserts silt fence fabric 28 into soil 4 with the lower portion 12 of silt fence fabric 28 being placed into a seam created in soil 4 by plow assembly 202. The upper portion 30 of silt fence fabric 28 remains above the top surface of soil 4 and will be held upright by stakes (not shown) to which upper portion 30 will be fixed. Invention 200 is mounted to the three-point hitch 8 of power unit 6 and may be raised, lowered, and tilted through operation of three-point hitch 8. Invention 200 comprises a leading frame 216 which is mountable by mounting assembly 208 at its leading end 218 to three-point hitch 8 of tractor 6 or to other powered maneuverable hitches of a power unit such as the bucket arms of a skid loader (not illustrated). Plow assembly 202 is joined hingedly to leading frame 216 by pivot hinge 230. Plow assembly 202 includes tongue 204 and plow member 14. Plow member 14 of the preferred embodiment 200 is identical to the plow member of the embodiment of FIGS. 1–5 and identical components of plow member 14 are identified by reference numerals already used for such components.

A coulter 222 may optionally be carried on frame 216 at the free end of spring loaded bar 224, the spring thereof urging coulter 222 downward. Coulter 222 slices through the top soil ahead of blade 64 which creates a vertical seam with a depth of approximately twelve to eighteen inches as plow member 14 passes through soil 4.

Plow assembly 202 is urged into longitudinal alignment with frame 216 by springs 206 which are located on either side of frame 216. As machine 200 moves, fabric 28 is drawn from roll 22 downward into plow share 38 within which it is rotated in direction such that it emanates from the leading edge 102 of plow member 14, and reverses direction and slides along the outside of plow member 14 as plow member 14 moves along. Lower portion 12 of silt fabric 28 is retained in soil 4 as invention 200 moves forward.

Figure 7:
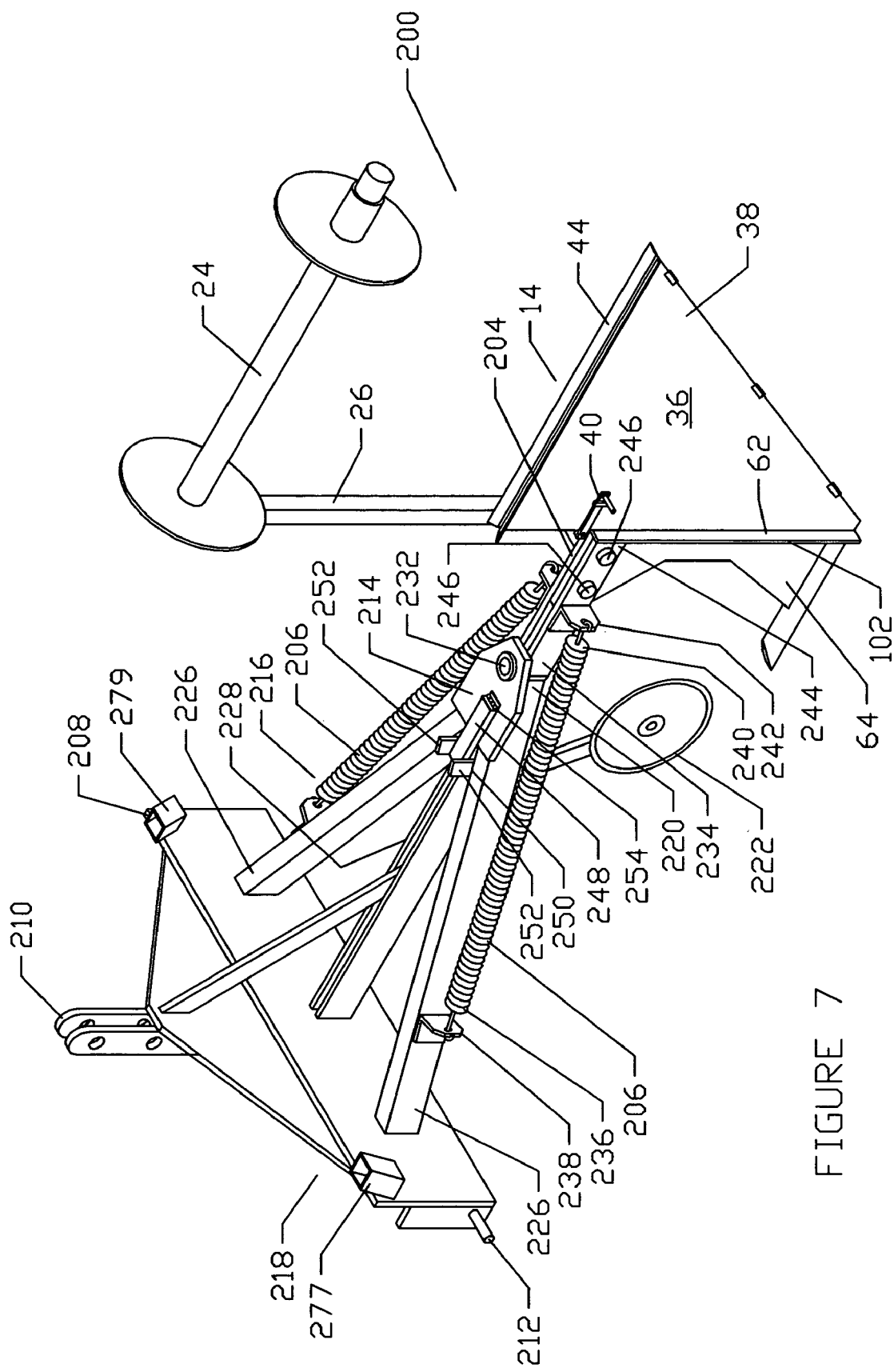
FIG. 7 is a perspective of the preferred embodiment of FIG. 6.

Referring now also to FIG. 7, additional details of the structure of silt fence installing machine 200 may be observed. Silt fence installing machine 200 comprises frame 216 which includes front mounting assembly 208 at leading end 218. Mounting assembly 208 includes top bracket 210 for selective mounting, for example, to the top adjustable link of a three-point hitch 8 of tractor 6 (see FIG. 6). The lower pair of attachment bars of a tractor's conventional three-point hitch may be selectively attached to lower attachment pins 212 which extend from opposing ends of mounting assembly 208. Alternatively top bracket 210 may be attached to an upper mounting point of a bucket mounting arm of a skid loader and mounting assembly 208 may be selectively mounted to an adapter which facilitates attachment of mounting assembly 208 to the bucket arms of a skid loader with its bucket removed.

Leg receiving brackets 277, 279 are welded to mounting assembly 208 so that upper ends of support legs (not shown) may be inserted therein to provide means for support the frame 216 when it is disengaged from a power unit.

Frame 216 comprises outer beam members 226 and center beam 228 which converge at the trailing end 220 of frame 216 on which hinge bracket 214 is fixed. Hinge bracket 214 retains hinge axle 232 which is vertically oriented and passes through hinge end 234 of tongue 204 such that tongue 204 may sway about hinge axle 232. Tongue 204 is biased by springs 206 to rest longitudinally aligned with center beam 228 of frame 216. Springs 206 are each in tension with the first end 236 of each retained to a stand off bracket 238 mounted to each outer beam 226. The second end 240 of each spring 206 is mounted to an attachment bracket 242 mounted on each opposing side of tongue 204. The trailing end 244 of tongue 204 which opposes hinge end 234 thereof is fixed to plow member 14 which is the equivalent structure to plow member 14 of FIGS. 1–5. Bar 24 is available to receive a roll of fabric and is supported above plow member 14 by upright 26 which is fixed to tongue 204.

At leading edge 102 of plow share 38 is deflector 62 which prevents entry of soil into the gap between stationary plate 44 and moveable plate 36 of plow share 38. Moveable plate 36 is retained in parallel to stationary plate 44 by latch 40 which is selectively operable to permit plate 36 to rotate about hinges 42. Blade 64 is mounted forward of leading end 102 of plow share 38 to cut soil in front of plow share 38. Plow member 14 is mounted to tongue 204 by shear pins 246 which will shear if plow member 14 strikes an embedded rock or other impenetrable obstacle.

A lock mechanism 248 may be pivotally mounted to hinge bracket 214 such that lock mechanism 248 may be flipped over latch hinge 254 from an unlocked position seen in FIG. 7 to a locked position wherein lock bracket 250 overlies tongue 204 with legs 252 of lock bracket 250 adjacent opposing sides of tongue 204 thereby restricting sway of plow assembly 202 about pivot axle 232.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

I claim:

1. A silt fence machine for mounting to a three point hitch of a power unit comprising
    a frame having a leading end and a trailing end, and having a longitudinal axis,
    a mounting member attached to the leading end of the frame,
    the mounting member adapted to be detachably mounted to the three point hitch,
    a plow member retained to the trailing end of the frame,
    the plow member including a top side, a leading edge generally perpendicular to the longitudinal axis of the frame, and at least a third edge,
    the plow member comprising a stationary plate and a pivotable plate, the pivotable plate hinged to the stationary plate along the at least a third edge of the plow member,
    the pivotable plate selectively pivotable between a closed position and an open position,
    the pivotable plate in its closed position disposed generally in parallel to the stationary plate and spaced apart therefrom a small distance,
    an elongate rod mounted at opposing ends thereof to one of the stationary plate and the pivotable plate,
    the elongate rod having a lower end adjacent a bottom of the leading edge of the plow member,
    the elongate rod oriented at substantially forty-five degrees from the leading edge of the plow member.

2. The silt fence machine of claim 1 wherein the mounting member is pivotable on the frame.

3. The silt fence machine of claim 1 wherein the top side of the plow member includes a flared elongate opening.

4. The silt fence machine of claim 1 wherein
    each of the stationary plate and the pivotable plate has an upper edge,
    the upper edge of the stationary plate flared away from the pivotable plate,
    the upper edge of the pivotable plate flared away from the stationary plate,
    the upper edge of the stationary plate and the upper edge of the pivotable plate defining a flared opening into a chute defined by the pivotable plate and the stationary plate.

5. The silt fence machine of claim 1 wherein
    the plow member includes a deflector mounted to the leading edge thereof,
    the deflector coveting at least a lower portion of the leading edge of the plow member,
    the deflector substantially nonparallel to the stationary plate.

6. The silt fence machine of claim 5 wherein
    the deflector extends substantially perpendicularly from the stationary plate to cover a leading edge of the pivotable plate.

7. The silt fence machine of claim 1 wherein
    a bar is supported on the frame,
    the bar disposed above the plow member,
    a roll of silt fence fabric is receivable on the bar.

8. The silt fence machine of claim 1 wherein
    the plow member is hinged to the trailing end of the frame.

9. The silt fence machine of claim 8 wherein
    the top side of the plow member has a flared opening,
    the plow member includes a deflector mounted to the leading edge thereof along a substantial portion thereof,
    the deflector substantially nonparallel to the stationery plate.

10. The silt fence machine of claim 1 wherein
    a stop member is selectively engageable with the plow member to restrict pivot of the plow member on the frame.

11. The silt fence machine of claim 1 wherein
    the plow member includes an elongate tooth fixed thereto extending from a bottom of the plow member,
    the stationary plate and the pivotable plate each having a bottom corner,
    the bottom corner of each of the stationary plate and the pivotable plate substantially horizontally aligned with the tooth of the plow member.

12. The silt fence machine of claim 11 wherein
    the lower end of the rod is substantially aligned with the tooth of the plow member.

13. The silt fence machine of claim 1 wherein
    the at least a third edge of the plow member is an inclined trailing edge interconnecting the top side and the leading edge,
    the rod substantially parallel to and adjacent the trailing edge.

14. The silt fence machine of claim 1 wherein
    the rod is constructed of stainless steel.

15. The silt fence machine of claim 1 wherein
    the top side of the plow member has a flared opening into which silt fence fabric may be received,
    the plow member includes a deflector mounted to the leading edge thereof along a lower portion thereof,
    the deflector covering the space between the stationary plate and the pivotable plate when the pivotable plate is in its closed position.

16. Apparatus to install silt fence comprising
a frame having a leading end and a trailing end and having a mounting member at the leading end,
the mounting member detachably mountable to a powered maneuverable hitch of a power unit whereby the maneuverable hitch may lift and tilt the apparatus,
an elongate tongue hinged to the trailing end of the frame,
a plow member retained td the tongue,
the plow member including a top side, a leading edge generally perpendicular to the tongue,
and an inclined trailing edge interconnecting the top side and the leading edge,
the inclined trailing edge defining a forty-five degree angle with the leading edge,
the plow member comprising a stationary plate and a pivotable plate, the pivotable plate selectively pivotable about the trailing edge of the plow member between a closed position and an open position,
the pivotable plate selectively retained in the closed position substantially parallel to and spaced apart a short distance from the stationary plate,
the stationary plate and the pivotable plate defining a chute therebetween when the pivotable plate is in its closed position,
an elongate rod mounted at opposing ends thereof to one of the stationary plate and the pivotable plate,
the elongate rod substantially parallel to the trailing edge of the plow member,
a support for carrying a roll of silt fence fabric above the plow member.

17. The apparatus of claim 16 wherein
the mounting member is detachably mountable to lifting apparatus of a front end loader.

18. The apparatus of claim 16 wherein
the mounting member comprises an upper connecting point and a pair of lower spaced apart connecting points.

19. The apparatus of claim 16 wherein
the tongue is biased to remain longitudinally aligned to the frame.

20. The apparatus of claim 16 wherein
the plow member includes a deflector mounted to the leading edge thereof,
the deflector covering at least a lower portion of the leading edge of the plow member,
the deflector substantially nonparallel to the stationary plate.

21. Apparatus to install silt fence comprising
a frame having a leading end and a trailing end, and having a longitudinal axis,
a mounting member disposed upon the leading end of the frame,
the mounting member adapted to detachably mount to a hitch of a power unit,
a plow member retained to the trailing end of the frame and supported thereon,
the frame supported upon the hitch of the power unit,
the plow member including a top, a leading edge, and at least a third edge,
the leading edge generally perpendicular to the longitudinal axis of the frame,
the plow member comprising a stationary plate and a movable plate, the movable plate selectively disposed adjacent the stationary plate in a closed position thereof,
the movable plate in its closed position disposed generally in parallel to the stationary plate and spaced apart therefrom a small distance,
an elongate rod mounted at opposing ends thereof to either the stationary plate or the movable plate,
the elongate rod having an upper end mounted adjacent a trailing end of the plow member and a lower end mounted adjacent a bottom of the plow member.

22. The apparatus of claim 21 wherein
the mounting member is pivotable on the frame about a substantially vertical axis.

23. The apparatus of claim 22 wherein
the top of the plow member includes a flared elongate opening,
the plow member includes a deflector mounted to the leading edge thereof,
the deflector covering at least a lower portion of the leading edge of the plow member,
a bar is supported on the frame,
a roll of silt fence fabric receivable on the bar,
the plow member including an elongate tooth fixed thereto extending generally at a perpendicular from the leading edge of the plow,
the at least a third edge of the plow member is an inclined trailing edge interconnecting the top and the leading edge.

24. The apparatus of claim 21 wherein
the mounting member comprises an upper connecting point and a pair of lower spaced apart connecting points.

25. The apparatus of claim 21 wherein
the plow member is hinged to the trailing end of the frame.

26. The apparatus of claim 21 wherein
an elongate tongue is hinged to the trailing end of the frame at a first end of the tongue,
the plow member retained to the tongue at an opposing end thereof.

27. The apparatus of claim 26 wherein
biasing members urge the plow member into longitudinal alignment with the tongue.

* * * * *